United States Patent
Colletti et al.

(10) Patent No.: US 10,780,807 B1
(45) Date of Patent: Sep. 22, 2020

(54) SEAT MOUNTED ADJUSTABLE LATERAL HEADREST

(71) Applicant: The Boeing Company, Chicago, IL (US)

(72) Inventors: Brian Paul Colletti, Mission Viejo, CA (US); Alessandra Uchoa Dantas, Long Beach, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 16/395,361

(22) Filed: Apr. 26, 2019

(51) Int. Cl.
*B60N 2/80* (2018.01)
*B64D 11/06* (2006.01)
*B60N 2/818* (2018.01)
*B60N 2/829* (2018.01)
*B60N 2/882* (2018.01)
*B60N 2/68* (2006.01)

(52) U.S. Cl.
CPC ............ *B60N 2/818* (2018.02); *B60N 2/829* (2018.02); *B60N 2/882* (2018.02); *B64D 11/0642* (2014.12); *B60N 2002/684* (2013.01); *B60Y 2200/50* (2013.01)

(58) Field of Classification Search
CPC ........ B60N 2/815; B60N 2/818; B60N 2/809; B60N 2/812; B60N 2/885; B64D 11/0642
See application file for complete search history.

(56) References Cited

U.S. PATENT DOCUMENTS

| | | | |
|---|---|---|---|
| 3,393,938 A * | 7/1968 | Meyer ................. | B60N 2/882 297/397 |
| 5,904,405 A * | 5/1999 | Wu ..................... | B60N 2/885 297/391 |
| 6,273,509 B1 * | 8/2001 | Reithmeier ........... | B60N 2/28 297/410 |
| 6,893,095 B2 * | 5/2005 | Schambre ............ | B60N 2/856 297/406 |
| 6,942,297 B2 | 9/2005 | Johnson | |
| 2006/0244297 A1 | 11/2006 | Demski | |
| 2013/0134753 A1 * | 5/2013 | Buehlmeyer .......... | B60N 2/809 297/284.1 |
| 2013/0161996 A1 * | 6/2013 | Sanchez ............... | B60N 2/885 297/397 |
| 2013/0234490 A1 * | 9/2013 | Millan .................. | A47C 7/38 297/391 |
| 2014/0368008 A1 * | 12/2014 | Mizobata ............. | B60N 2/427 297/216.12 |
| 2015/0329024 A1 * | 11/2015 | Szczygiel ............. | B60N 2/4882 297/391 |
| 2016/0250952 A1 * | 9/2016 | Sasaki .................. | B60N 2/815 297/410 |
| 2017/0151894 A1 * | 6/2017 | McRoberts .......... | B60N 2/2884 |

FOREIGN PATENT DOCUMENTS

DE     102005017580 B3 *    9/2006 ............ B60N 2/815

\* cited by examiner

*Primary Examiner* — Timothy J Brindley
(74) *Attorney, Agent, or Firm* — Coats & Bennett, PLLC

(57) ABSTRACT

An adjustable headrest assembly for use with a passenger seat of an aircraft, a seat assembly that includes the headrest assembly, and related methods. The headrest assembly provides lateral support for a passenger's head, and includes a seatback mounted rail, and a headrest that slides along the rail so that the vertical position of the headrest can be adjusted. The headrest assembly also includes a locking mechanism so that the headrest can be releasably locked in a desired vertical position along the rail.

20 Claims, 7 Drawing Sheets

SEAT MOUNTED ADJUSTABLE LATERAL HEADREST

TECHNOLOGICAL FIELD

The present disclosure relates generally to headrests for passengers in vehicles, such as aircraft, and more particularly to seat mounted adjustable headrests, and related seat assemblies and methods of manufacturing and/or servicing.

BACKGROUND

It is common for passenger vehicles, such as aircraft, to have headrests associated with each passenger seat. Typically, the headrest is mounted to a center section of the seatback of the seat, and takes the form of a cushion. In some situations, the headrest is internally divided into sections, with two "wings" which can be manually bent relative to the central section, so as to form somewhat of a cradle for the head. While such headrests provide some comfort to passengers, they tend to provide less than desirable lateral support for the head.

Accordingly, there is a need for alternative approaches to headrests. Such approaches should advantageously provide lateral support to a passenger's head, and optionally be adjustable.

SUMMARY

Aspects of the present disclosure are generally directed to a headrest assembly for use with a passenger seat of an aircraft, a seat assembly that includes the headrest assembly, and related methods. The headrest assembly is adjustable and is intended to provide lateral support for a passenger's head. In general, the headrest assembly includes a seatback mounted rail and a headrest that slides along the rail so that the vertical position of the headrest can be adjusted. The headrest assembly also includes a locking mechanism so that the headrest can be releasably locked in a desired vertical position along the rail.

In one or more aspects, the present disclosure is directed to an adjustable headrest assembly for use with a passenger seat of an aircraft. The passenger seat has a seat portion and a seatback. The headrest assembly includes a rail, a headrest, and a locking mechanism. The rail is elongate and extends along a rail longitudinal axis. The rail has a plurality of holes disposed in spaced relation to each other along the rail longitudinal axis. The headrest is movably mounted on the rail. The headrest includes a carriage frame slidably mounted on the rail and a cushion mounted to the carriage frame. The carriage frame is rigid and includes a passage extending through the carriage frame. The locking mechanism is operative to lock the headrest in a selected position along the rail. The locking mechanism includes a locking pin, a bias element (e.g., spring), an actuator, and an actuator rod. The locking pin is configured to releasably engage with a hole of the plurality of holes in the rail. The bias element is disposed so as to bias the locking pin toward the rail. The actuator button is disposed on a distal edge of the carriage frame. The actuator rod operatively interconnects the actuator button and the locking pin. The actuator rod is disposed in the passage, internal to the carriage frame. The locking mechanism is configured such that depression of the actuator button moves the locking pin away from the rail so as to allow the headrest to be slidably moved relative to the rail. The headrest is slidably adjustable to two or more positions along the rail longitudinal axis to provide lateral support for a user's head when the user is sitting in the passenger seat. The cushion is optionally removably mounted to the carriage frame.

In other aspects, the disclosure relates to a seat assembly for an aircraft. The seat assembly includes a passenger seat and a headrest assembly. The passenger seat has a seat portion and a seatback that is adjustably positionable relative to the seat portion. The headrest assembly is intended to provide lateral support to a user sitting in the passenger seat. The headrest assembly includes a rail, a headrest, and a locking mechanism. The rail is mounted to a lateral portion of the seatback. The rail is elongate and extends along a rail longitudinal axis. The rail has a plurality of holes disposed in spaced relation to each other along the rail longitudinal axis. The headrest is movably mounted on the rail. The headrest includes a carriage frame slidably mounted on the rail and a cushion mounted to the carriage frame. The carriage frame is rigid. The locking mechanism is operative to lock the headrest in a selected position along the rail. The locking mechanism includes a locking pin and an actuator button. The locking pin is configured to releasably engage with a hole of the plurality of holes in the rail. The locking pin is biased toward the rail. The actuator button is operatively coupled to the locking pin such that depression of the actuator button moves the locking pin away from the rail so as to allow the headrest to be slidably moved relative to the rail. The headrest is slidably adjustable to two or more positions along the rail longitudinal axis to provide lateral support for a user's head when the user is sitting in the passenger seat.

In other aspects, the disclosure relates to a method of manufacturing or servicing an aircraft having a passenger cabin. The method includes installing a headrest assembly on a passenger seat to provide lateral support for a user's head when the user is sitting in the passenger seat. The passenger seat has a seat portion and a seatback that is adjustably positionable relative to the seat portion. The headrest assembly includes a rail, a headrest, and a locking mechanism. The headrest is movably mounted on the rail. The installing includes mounting the rail so that the rail is mounted to the seatback and disposed laterally proximate the seatback. The method further includes actuating the locking mechanism to allow the headrest to be slidably moved along the rail. In some aspects, the method optionally includes thereafter sliding the headrest along the rail longitudinal axis. In some aspects, the headrest includes a carriage frame slidably mounted on the rail and a cushion mounted to the carriage frame, and the method further optionally includes unsnapping the cushion from the carriage frame. In some aspects, the method further includes detaching the headrest from the rail by sliding the headrest upwardly off an upper end of the rail.

The features, functions, and advantages that have been discussed can be achieved independently in various aspects or may be combined in yet other aspects further details of which can be seen with reference to the following description and the drawings.

BRIEF DESCRIPTION OF THE DRAWINGS

Having thus described the disclosure in general terms, reference will now be made to the accompanying drawings, which are not necessarily drawn to scale.

Figure 1:
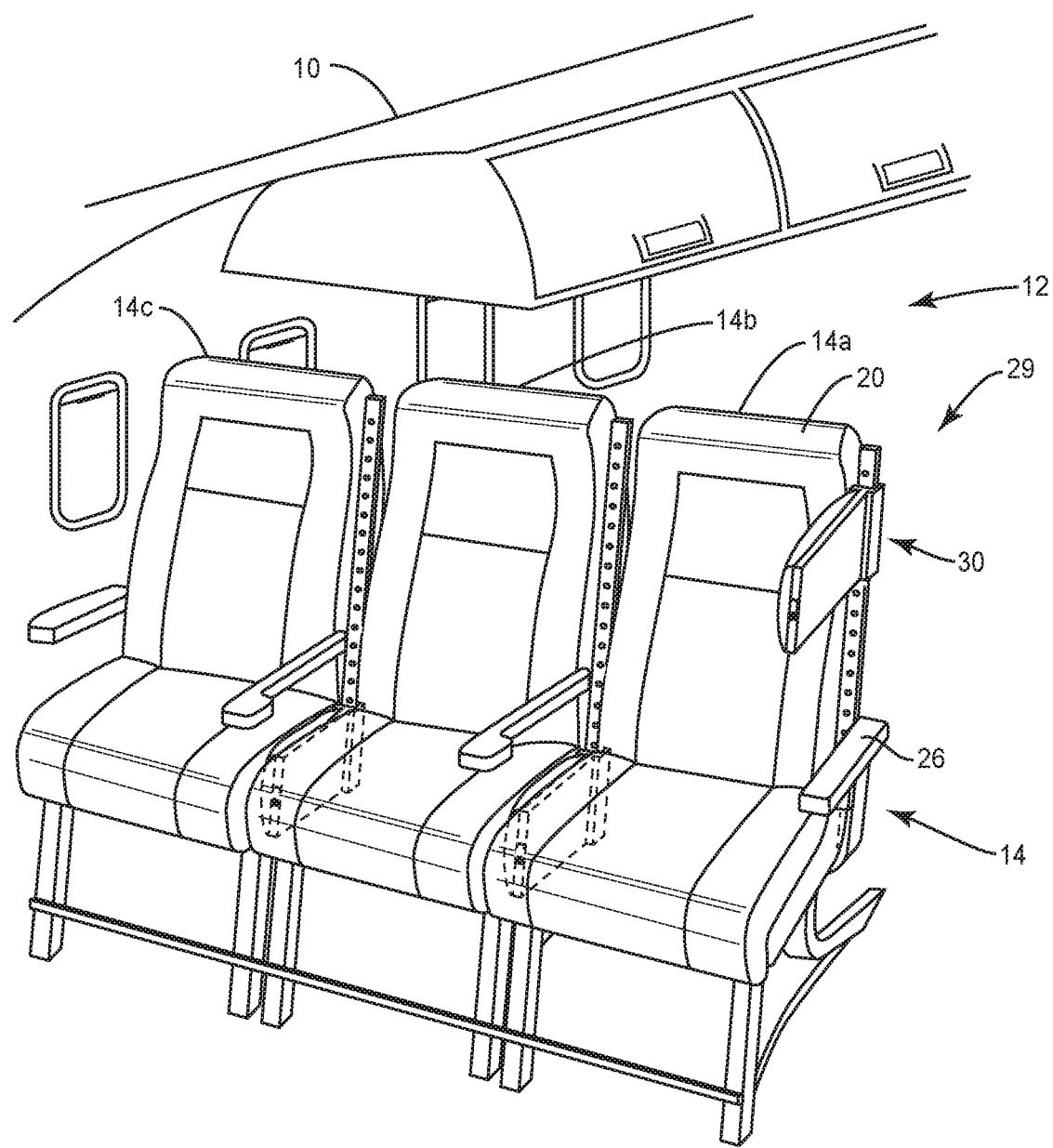

FIG. 1 perspective view of a row of passenger seats.

Figure 2:
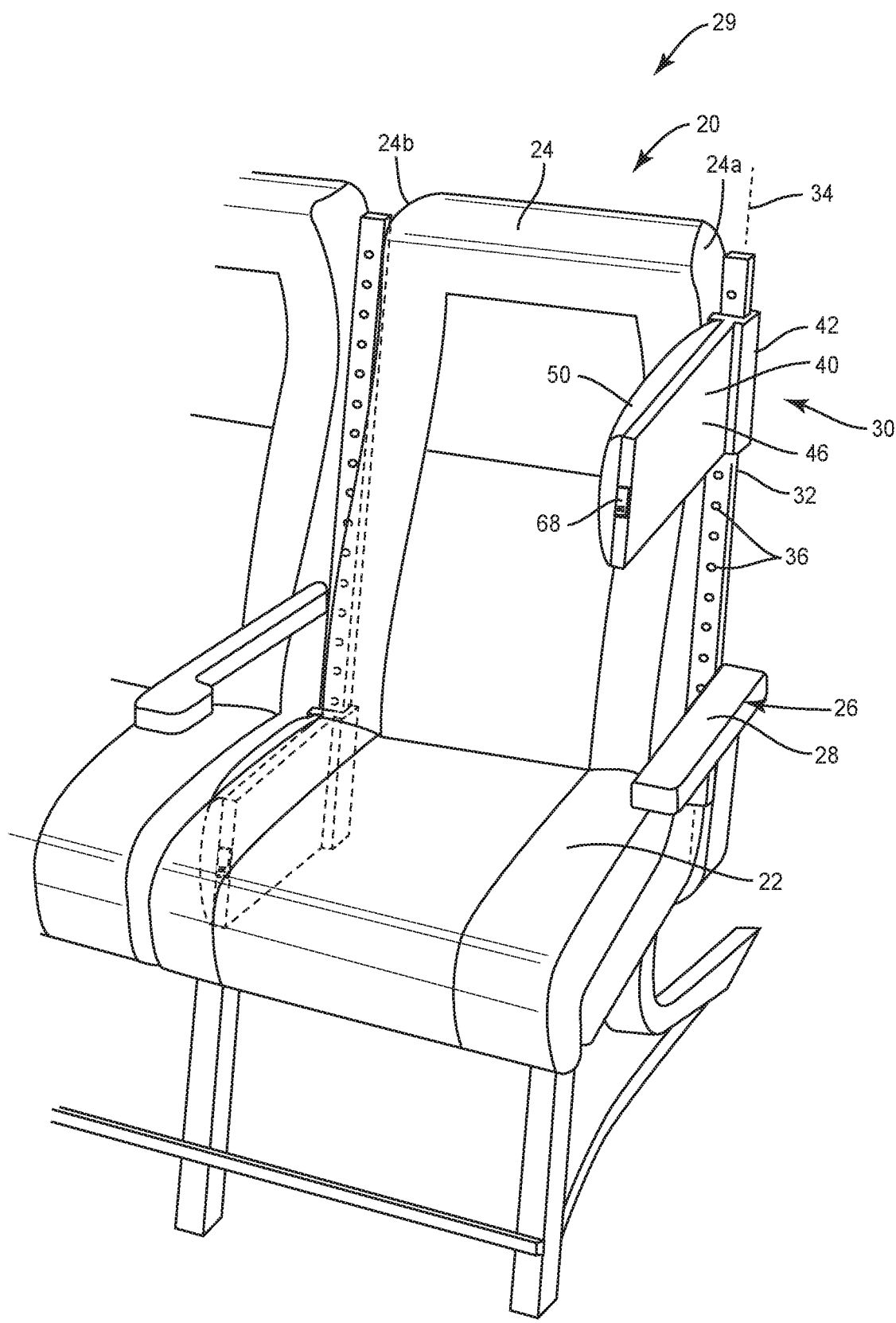

FIG. 2 shows a passenger seat with a headrest assembly according to aspects of the present disclosure in an upper position.

Figure 3:
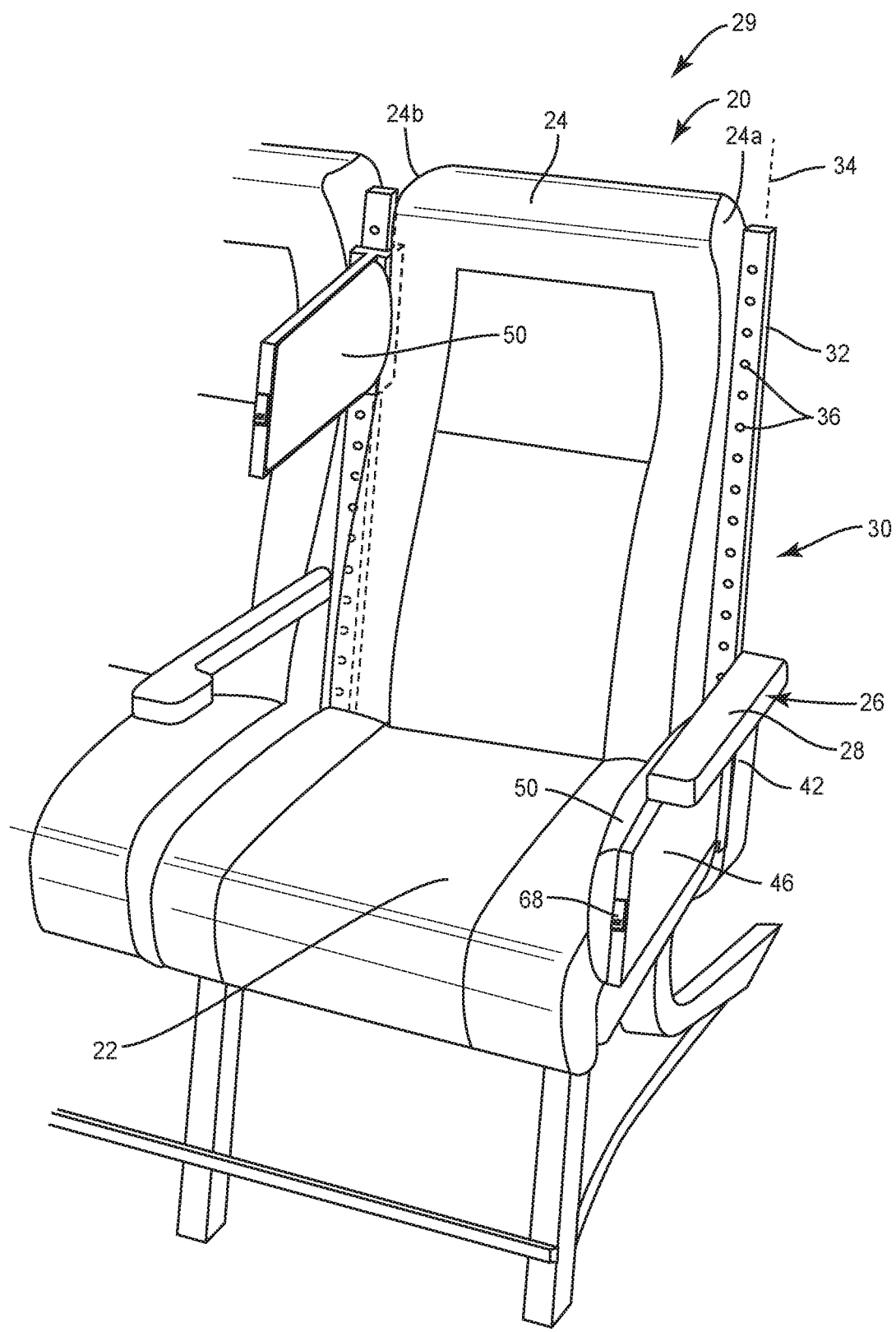

FIG. 3 shows the passenger seat of FIG. 2, with the headrest assembly in a lower position.

Figure 4:
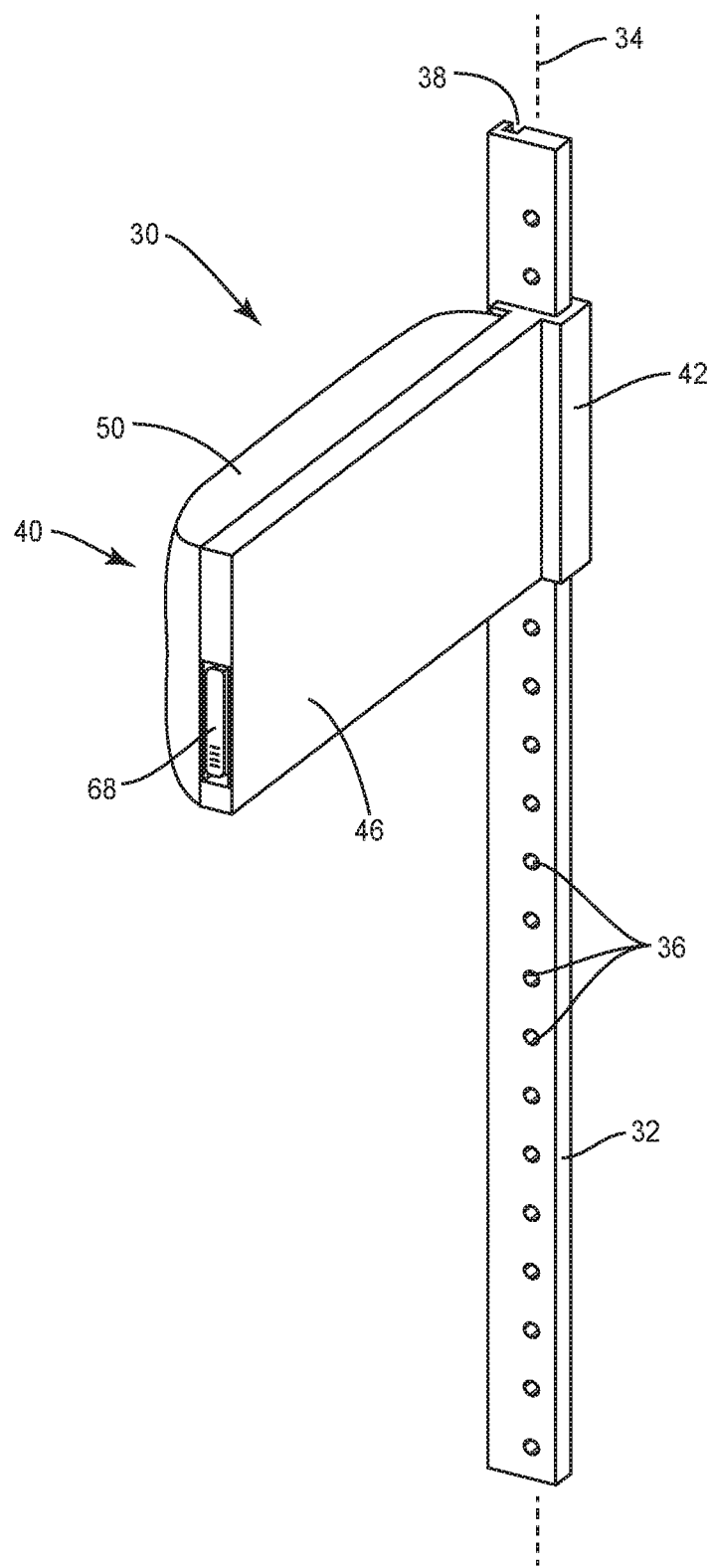

FIG. 4 shows a perspective view of a headrest assembly according to aspects of the present disclosure.

Figures 5, 6:
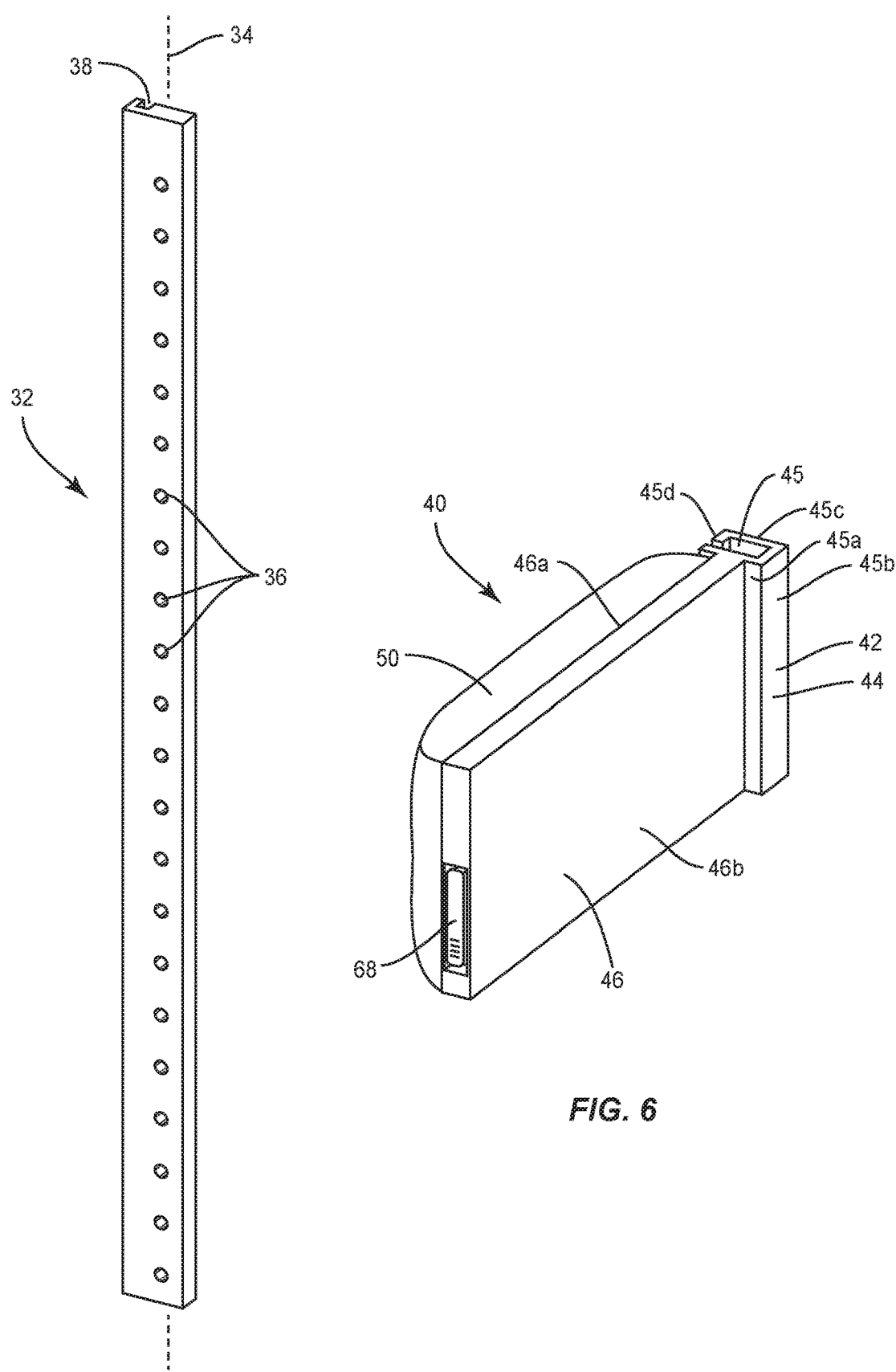

FIG. 5 shows a perspective view of a rail of the headrest assembly of FIG. 4.

FIG. 6 shows a perspective view of a headrest of the headrest assembly of FIG. 4.

Figure 7:
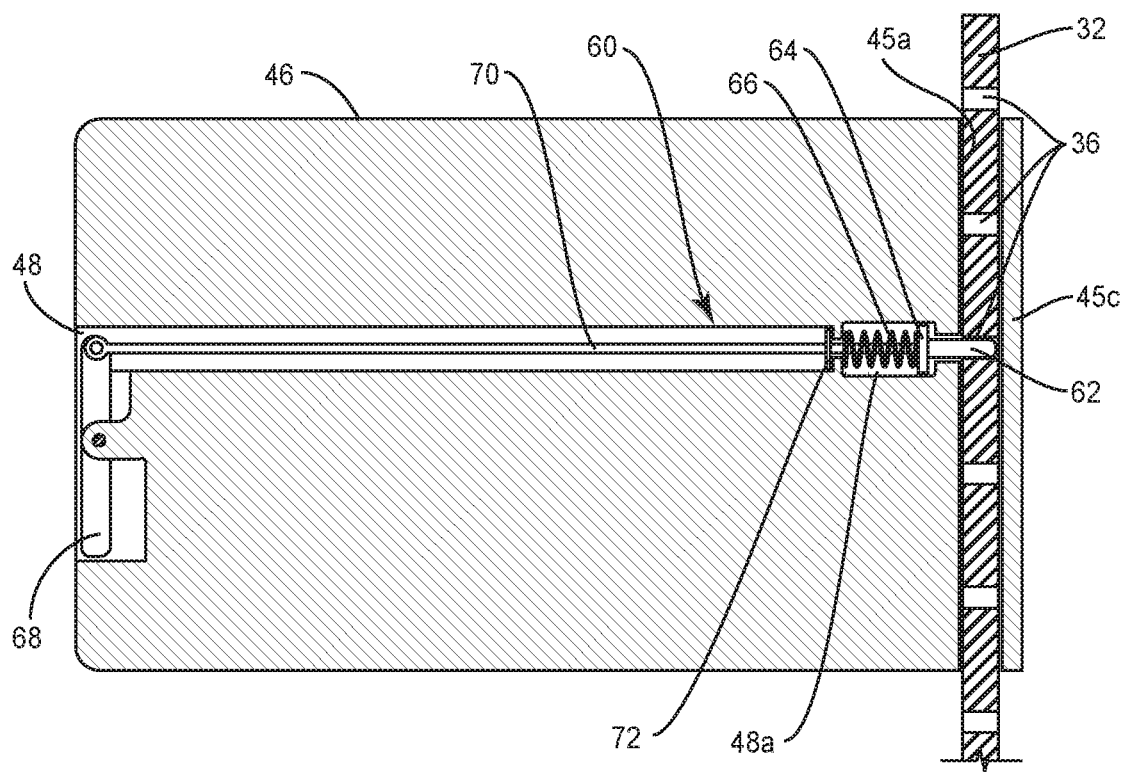

FIG. 7 shows a partial cutaway side view of the headrest assembly of FIG. 4.

Figure 8:
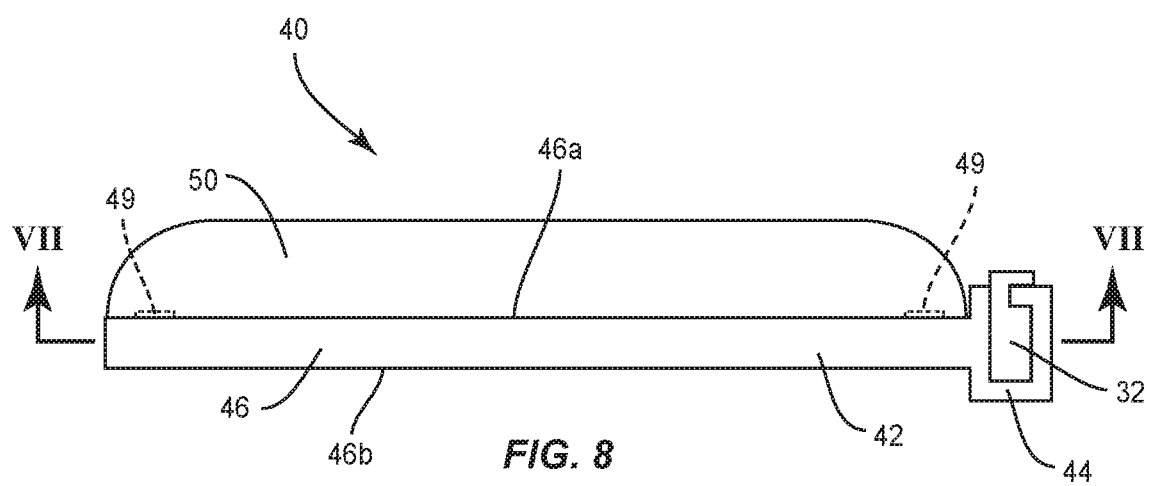

FIG. 8 shows a top view of the headrest assembly of FIG. 4.

Figure 9:
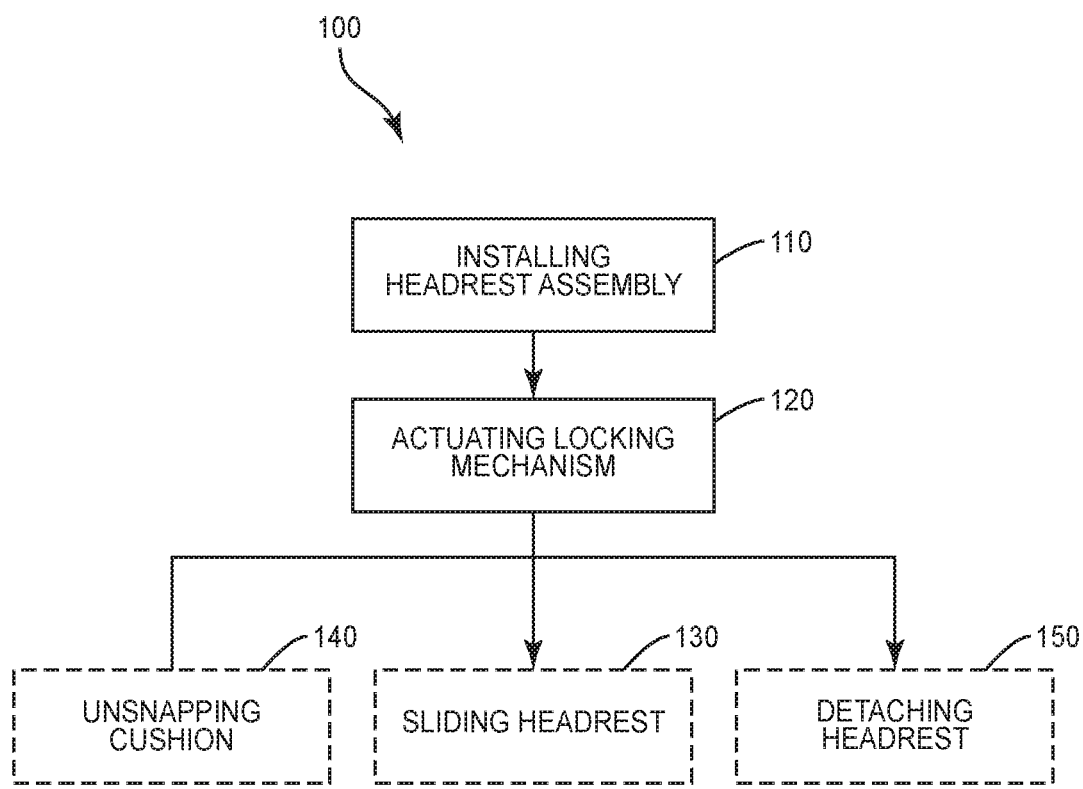

FIG. 9 shows a flowchart pertaining to aspects of the present disclosure.

DETAILED DESCRIPTION

Aspects of the present disclosure are generally directed to a headrest assembly 30 for use with a passenger seat 20 of an aircraft, a seat assembly 29 that includes the headrest assembly 30, and related methods. The headrest assembly 30 is adjustable and is intended to provide lateral support for a passenger's head. The headrest assembly 30 includes a seatback mounted rail 32 and a headrest 40 that slides along the rail 32 so that the vertical position of the headrest 40 can be adjusted. The headrest assembly 30 also includes a locking mechanism 60 so that the headrest 40 can be releasably locked in a desired vertical position along the rail 32.

Referring to FIG. 1, the headrest assembly 30 is intended to be used with a passenger seat 20 of a vehicle, such as a passenger seat 20 of an aircraft 10, which optionally is a seat on a row 14 of seats. The passenger seat 20 associated with the headrest assembly 30 may be an aisle seat 14a, an window seat 14c, and/or an intermediate (or "middle") seat 14b, typically located in a passenger cabin 12 of the aircraft 10. The passenger seat 20 includes a seat portion 22 and a seatback 24, with the seatback 24 adjustably positionable relative to the seat portion 22 (e.g., the seatback 24 can be tilted relative to the seat portion 22). One or more armrests 26 are typically associated with the passenger seat 20, and/or two adjacent passenger seats 20 may share an armrest 26. The armrest 26 is disposed in spaced relation to the seat portion 22, at a vertically higher position, and typically laterally offset from the seat portion 22. The upper surface 28 of the armrest 26 provides a location for the passenger to rest their arm. Together, the passenger seat 20 and the headrest assembly 30 form a seat assembly 29.

An exemplary seat assembly 29 is shown in FIGS. 1-3. The seat assembly includes a passenger seat 20 and a headrest assembly 30 attached to the passenger seat 20.

In general, the headrest assembly 30 includes a rail 32, a headrest 40 moveably mounted on the rail 32, and a locking mechanism 60. The rail 32 is elongate and extends along a rail longitudinal axis 34. See FIGS. 4-5. The rail 32 has a plurality of holes 36 disposed in spaced relation to each other along the rail longitudinal axis 34 on the front face of the rail 32. The holes 36 are optionally arranged in a regularly spaced series that extends along the rail longitudinal axis 34. The holes 36 may be through holes, or may be blind holes with their openings oriented forwardly. The rail 32 also optionally includes a longitudinally running groove 38 on a rear face of the rail 32 that is laterally spaced from the holes 36. The groove 38 cooperates with a retention flange 45d of the headrest 40 to assist in lateral retention of the headrest 40, as discussed further below.

The headrest 40 is movably mounted on the rail 32, and optionally removably mounted on the rail 32. The headrest 40 includes a carriage frame 42 and a cushion 50. The carriage frame 42 is slidably mounted on the rail 32. The carriage frame 42 is rigid and includes a proximal section 44 and a mounting plate 46. The proximal section 44 slidably inter-engages with the rail 32, with the rail 32 extending through the proximal section 44. In order to facilitate this sliding inter-engagement, the proximal section 44 includes a recess or slot 45 that is shaped to accept the rail 32. In some aspects, the proximal section 44 includes a front wall 45a, a side wall 45b, a rear wall 45c, and a retention flange 45d that are collectively formed in an open loop. The front wall 45a extends parallel to the front face of the rail 32. The side wall 45b extends parallel to the side face of the rail 32, and the rear wall 45c extends parallel to the corresponding section of the rear face of the rail 32. The retention flange 45d extends from the rear wall 45c, forwardly into the groove 38 on rail 32. Thus, the retention flange 45d extends parallel to the mounting plate 46. The retention flange 45d engaging with the groove 38 on rail 32 helps provide lateral stability to the headrest 40, preventing the headrest 40 from moving laterally off the rail 32.

The mounting plate 46 extends forwardly from the proximal section 44; thus, the mounting plate 46 extends in a direction away from the rail 32. The mounting plate 46 is supported by the proximal section 44 in cantilever fashion. The mounting plate 46 is generally flat and planar, and includes a first side 46a (e.g., left) and a second side 46b (e.g., right) opposite the first side 46a. One or more snaps 49 are optionally disposed on the laterally facing first side 46a of the mounting plate 46. Optionally, one or more snaps 49 are also disposed on the oppositely facing second side 46b of the mounting plate 46. As shown in FIG. 7, the mounting plate 46 includes passage 48 for receiving the actuator rod 70 of the locking mechanism 60. The passage 48 extends through the mounting plate 46 (and therefore through the carriage frame 42); thus, passage 48 is open-ended on both ends. The passage 48 is optionally straight, and optionally includes an enlarged area 48a nearer to the proximal section 44. The passage 48 opens to a recess on the distal end of the mounting plate 46. The recess receives the actuator button 68, as discussed further below.

The cushion 50 is mounted to the carriage frame 42. The cushion 50 is optionally shaped similarly to the mounting plate 46, so that when the cushion 50 is mounted on the mounting plate 46, little or none of the mounting plate 46 can be seen by the passenger in the passenger seat 20. The cushion 50 is made from suitable cushion material(s) known in the art. The cushion 50 may be permanently affixed to the carriage frame 42. However, in some aspects, the cushion 50 is removably mounted to the mounting plate 46 by releasable fasteners, such as by one or more snaps 49, so that the cushion 50 can be removed from the mounting plate 46 for cleaning and/or replacement if desired. Other forms of releasable fastening may be used in addition or alternatively to the snaps 49, such as hook and loop fasteners, quarter-turn fasteners, and the like. In some aspects, the carriage frame 42 and the cushion 50 are configured such that the cushion 50 is mountable to only one side of the mounting plate 46, such as first side 46a. In some aspects, the carriage frame 42 and the cushion 50 are configured such that the cushion 50 is mountable to either side of the mounting plate 46, as selected by the user; for such aspects, the headrest 40 is configured such that the cushion 50 is mountable to the first side 46a and/or the cushion 50 is mountable to the second side 46b. Thus, in some aspects, the cushion 50 can be removed (demounted) from the first side 46*a* of the mounting plate 46, and then attached (remounted) to the second side 46*b* of the mounting plate 46, and vice versa.

The locking mechanism 60 is operative to lock the headrest 40 in a selected position along the rail 32. The locking mechanism 60 includes locking pin 62, bias element 66 (e.g., spring), actuator button 68, and actuator rod 70. The locking mechanism 60 is configured such that depression of the actuator button 68 moves the locking pin 62 away from the rail 32 so as to allow the headrest 40 to be slidably moved relative to the rail 32.

The locking pin 62 is movably disposed at least partially in the proximal section 44 of carriage frame 42, near rail 32. The locking pin 62 is configured to releasably engage with a selected hole 36 of the plurality of holes in rail 32. In some aspects, the holes 36 have a cylindrical cross-section, and the locking pin 62 likewise has a cylindrical in cross-section. Other cross-sectional shapes for the holes 36 and the locking pin 62 may alternatively be employed. In some aspects, the locking pin 62 has a shoulder 64 that is disposed distally relative to the locking pin's proximal tip.

The actuator button 68 is disposed on a distal edge of the carriage frame 42. As shown in FIGS. 6-7, the actuator button 68 is optionally disposed in recess of mounting plate 46. The actuator button 68 is pivotally mounted to the mounting plate 46, so that depression of one end of the actuator button 68 causes the other end of the actuator button 68 to move away from the passage 48. As can be appreciated, the pivot axis for the actuator button 68 is offset from the passage 48.

The actuator rod 70 operatively interconnects the actuator button 68 and the locking pin 62. The actuator rod 70 is disposed in the passage 48, internal to the carriage frame 42, and pivotally connects to the actuator button 68. The actuator rod 70 is optionally straight and rigid. The actuator rod 70 includes a shoulder 72 toward its proximal end. The shoulder 72 is intended to function as a stop by hitting against a restriction in the passage 48, with the restriction located at the distal edge of the enlarged area 48*a*. In some aspects, the actuator rod 70 and the locking pin 62 threadably inter-engage with each other. In some aspects, the actuator rod 70 is a single piece; in some aspects, the actuator rod 70 is multiple pieces that are affixed together.

The bias element 66 is disposed so as to bias the locking pin 62 toward the rail 32. The bias element 66 may take any suitable form, such as coil spring and/or a suitably shaped block of elastomeric material. The bias element 66 presses on one end against the restriction in passage 48, and on the other end against the shoulder 64 of locking pin 62. As can be appreciated, when the headrest 40 is assembled, the bias element 66 is disposed about a portion of the actuator rod 70 and/or the locking pin 62, and is disposed in the enlarged area 48*a*.

The headrest 40 is slidably adjustable to two or more positions along the rail longitudinal axis 34 to provide lateral support for a user's head when the user is sitting in the passenger seat 20. For example, the rightmost portion of FIG. 1 (near aisle seat 14*a*) shows the headrest 40 in an upper or deployed position. In the deployed position, the headrest 40 is located at a greater vertical position than the armrest 26. The headrest 40 can be slid down the rail 32 to a lower position, that may correspond to a storage position. See, e.g., FIG. 3. In the storage position, the headrest 40 is not higher than the upper surface 28 of the armrest 26. In some aspects, the headrest 40, in the storage position, is disposed laterally between the seat portion 22 and the armrest 26. In such a storage position, the headrest 40 optionally is disposed vertically below the upper face of the seat portion 22 so as to be between adjacent passenger seats 20 (see FIG. 1), and/or may be disposed as least partially vertically above the seat portion 22 so as to function as a leg/thigh rest. In some aspects, the armrest 26 is hinged to allow access to a storage compartment (not shown), so that the headrest 40, in the storage position, is disposed directly underneath the armrest upper surface 28 and in the storage compartment. Note that in the latter aspects, there should be no holes in the rail 32 corresponding to the storage position, unless access is provided to the actuator button 68 so as to allow the headrest 40 to be moved from the storage position.

In some aspects, the headrest 40 is not removable from the rail 32. For example, there may be suitable stop (not shown) installed on the rail 32 that prevents the headrest 40 from being detached from the rail 32 by sliding off the end of rail 32 in one or both directions (e.g., up and/or down). In some aspects, the headrest 40 is detachable from the rail 32, such as by unlocking the locking mechanism 60 (see discussion below) and sliding the headrest 40 upwardly off an upper end of the rail 32.

As mentioned above, the locking mechanism 60 is operative to lock the headrest 40 in a selected position along the rail 32. When the actuator button 68 is not pushed, the bias force supplied by the bias element 66 urges the actuator rod 70 toward the rail 32, such that the locking pin 62 extends into a selected hole 36 in the rail 32. The inter-engagement of the locking pin 62 and the hole 36 holds the headrest 40 in the corresponding position along the rail 32. To move the headrest 40, the actuator button 68 is pressed, which moves the actuator rod 70, and thus the locking pin 62, away from the rail 32, so that the locking pin 62 is not extending into hole 36. The user then slides the headrest 40 to along the rail 32 to a desired location, and releases the actuator button 68. Release of the actuator button 68 allows the force of the bias element 66 to displace the actuator rod 70 toward the rail 32, and the locking pin 62 to engage the corresponding hole 36. Thus, the bias element 66 also provides a reset force for the actuator button 68.

In some aspects, the present disclosure relates to a method (100) of manufacturing or servicing an aircraft having a passenger cabin 12. The method (100) includes installing (110) a headrest assembly 30 on a passenger seat 20 to provide lateral support for a user's head when the user is sitting in the passenger seat 20. As mentioned above, the passenger seat 20 has a seat portion 22 and a seatback 24 that is adjustably positionable relative to the seat portion 22. As mentioned above, the headrest assembly 30 includes a rail 32, a headrest 40 movably mounted on the rail 32, and a locking mechanism 60. The installing (110) includes mounting the rail 32 so that the rail 32 is mounted to the seatback 24 and disposed laterally proximate the seatback 24. The method continues with actuating (120) the locking mechanism 60 to allow the headrest 40 to be slidably moved along the rail 32. In some aspects, the method further continues with sliding (130) the headrest 40 along the rail longitudinal axis 34. As mentioned above, the headrest 40 comprises a carriage frame 42 slidably mounted on the rail 32 and a cushion 50 mounted to the carriage frame 42. In some aspects, the method further includes unsnapping (140) the cushion 50 from the carriage frame 42. In some aspects, the method includes detaching (150) the headrest 40 from the rail 32 by sliding the headrest 40 upwardly off an upper end of the rail 32.

Note that the rail 32 of the headrest assembly 30 may be installed on either the aisle side 24*a* or the opposing outboard side 24*b* of the seatback 24 of the passenger seat 20, and that the passenger seat 20 may be an aisle seat 14a, a middle seat 14b, or a window seat 14c. Thus, in some aspects, the passenger seat 20 is an aisle seat 14a, and the rail 32 is mounted to the seatback 24 on an aisle side 24a of the passenger seat 20. In some other aspects, the passenger seat 20 is a middle seat 14b, and the rail 32 is mounted to the seatback 24 on an outboard side 24b of the passenger seat 20. Each possible combination of the side (aisle side 24a, outboard side 24b) of the seatback 24 and the type of passenger seat 20 (aisle seat 14a, middle seat 14b, window seat 14c) is contemplated, along with the cushion 50 being mounted to either side (first side 46a or second side 46b) of the mounting plate 46. In some aspects, the rail 32 is disposed entirely (laterally) outside the seatback 24 to which it is mounted. Such a rail 32 may be mounted to the seatback 24 via suitable lateral flanges (not shown), laterally extending posts, or the like. In some aspects, the rail 32 is disposed partially within the seatback 24.

For aspects where the headrest 40 can be lowered so that all or part of the headrest is below the upper surface 28 of armrest 26, it is advantageous to position and/or configure the armrest 26 so that the downward travel of the headrest 40 is not impeded by the armrest 26. Thus, in some aspects, the armrest 26 is laterally offset from the seat portion 22 and rail 32 so that a sufficient gap exists to the seat-side of the armrest for the headrest 40 to slide down the rail 32 to the storage position without hitting the armrest 26. See the aisle side armrest 26 of the aisle seat 14a in FIGS. 1-3. In some aspects, the armrest 26 is shaped so that the headrest 40 can slide down the rail 32 to the storage position without hitting the armrest 26 by passing into/through an appropriately shaped cutout in the armrest 26. See the outboard side armrest 26 of the aisle seat 14a in FIGS. 1-3.

The present disclosure may, of course, be carried out in other ways than those specifically set forth herein without departing from essential characteristics of the disclosure. The present embodiments are to be considered in all respects as illustrative and not restrictive, and all changes coming within the meaning and equivalency range of the appended claims are intended to be embraced therein.

What is claimed is:

1. An adjustable headrest assembly for use with a passenger seat of an aircraft having a seat portion and a seatback, the headrest assembly comprising:
   a rail; the rail being elongate and extending along a rail longitudinal axis; the rail having a plurality of holes disposed in spaced relation to each other along the rail longitudinal axis; the rail being configured to be mounted to a lateral portion of the seatback;
   a headrest movably mounted on the rail; the headrest comprising a carriage frame slidably mounted on the rail and a cushion mounted to the carriage frame;
   wherein the carriage frame is rigid and includes a passage extending through the carriage frame;
   a locking mechanism operative to lock the headrest in a selected position along the rail; the locking mechanism comprising:
      a locking pin configured to releasably engage with a hole of the plurality of holes in the rail;
      a bias element disposed so as to bias the locking pin toward the rail;
      an actuator button disposed on a distal edge of the carriage frame;
      an actuator rod operatively interconnecting the actuator button and the locking pin; wherein the actuator rod is disposed in the passage, internal to the carriage frame;
   wherein the locking mechanism is configured such that depression of the actuator button moves the locking pin away from the rail so as to allow the headrest to be slidably moved relative to the rail; and
   wherein the headrest is slidably adjustable to two or more positions along the rail longitudinal axis to provide lateral support for a user's head when the user is sitting in the passenger seat.

2. The adjustable headrest assembly of claim 1, wherein the cushion is removably mounted to the carriage frame.

3. The adjustable headrest assembly of claim 1:
   wherein the carriage frame includes a mounting plate extending away from the rail;
      the mounting plate having a first side and a second side opposite the first side; and
   wherein the headrest is configured such that the cushion is mountable to the first side and the cushion is mountable to the second side.

4. The adjustable headrest assembly of claim 1, wherein the carriage frame includes a proximal section that slidably inter-engages with the rail; and wherein the rail extends through the proximal section.

5. The adjustable headrest assembly of claim 1, wherein the locking pin is cylindrical in cross-section.

6. A seat assembly for an aircraft, the seat assembly comprising:
   a passenger seat having a seat portion and a seatback that is adjustably positionable relative to the seat portion;
   a headrest assembly for providing lateral support to a user sitting in the passenger seat; the headrest assembly comprising:
      a rail mounted to a lateral portion of the seatback; the rail being elongate and extending along a rail longitudinal axis; the rail having a plurality of holes disposed in spaced relation to each other along the rail longitudinal axis;
      a headrest movably mounted on the rail; the headrest comprising a carriage frame slidably mounted on the rail and a cushion mounted to the carriage frame;
      wherein the carriage frame is rigid;
      a locking mechanism operative to lock the headrest in a selected position along the rail; the locking mechanism comprising:
         a locking pin configured to releasably engage with a hole of the plurality of holes in the rail; the locking pin biased toward the rail;
         an actuator button operatively coupled to the locking pin such that depression of the actuator button moves the locking pin away from the rail so as to allow the headrest to be slidably moved relative to the rail; and
      wherein the headrest is slidably adjustable to two or more positions along the rail longitudinal axis to provide lateral support for a user's head when the user is sitting in the passenger seat.

7. The seat assembly of claim 6, wherein the cushion is removably mounted to the carriage frame.

8. The seat assembly of claim 6, wherein the passenger seat is an aisle seat, and wherein the rail is mounted to the seatback on an aisle side of the passenger seat.

9. The seat assembly of claim 6, wherein the passenger seat is a middle seat, and wherein the rail is mounted to the seatback on an outboard side of the passenger seat.

10. The seat assembly of claim 6:
   wherein the cushion is removably mounted to the carriage frame;

wherein the carriage frame includes a mounting plate extending away from the rail;
the mounting plate having a first side and a second side opposite the first side; and
wherein the headrest is configured such that the cushion is mountable to the first side and the cushion is mountable to the second side.

11. The seat assembly of claim 6, wherein the headrest assembly is detachable from the rail by sliding the headrest upwardly off an upper end of the rail.

12. The seat assembly of claim 6, wherein the rail is disposed laterally outside the seatback.

13. The seat assembly of claim 6:
wherein the seat further comprises an armrest disposed in spaced relation to the seat portion; the armrest having an upper surface;
wherein the headrest is slidably movable between the following positions:
a deployed position where the headrest is located at a greater vertical position than the armrest; and
a storage position where the headrest is located not higher than the upper surface of the armrest.

14. The seat assembly of claim 13, wherein, in the storage position, the headrest is disposed laterally between the seat portion and the armrest.

15. The seat assembly of claim 6:
wherein the carriage frame includes a passage extending through the carriage frame;
wherein the locking mechanism further comprises:
a bias element disposed so as to bias the locking pin toward the rail;
an actuator rod operatively interconnecting the actuator button and the locking pin; wherein the actuator rod is disposed in the passage, internal to the carriage frame; and
wherein the actuator button is disposed on a distal edge of the carriage frame.

16. The seat assembly of claim 6, wherein the carriage frame includes a proximal section that slidably inter-engages with the rail; and wherein the rail extends through the proximal section.

17. A method of manufacturing or servicing an aircraft having a passenger cabin, the method comprising:
installing a headrest assembly on a passenger seat to provide lateral support for a user's head when the user is sitting in the passenger seat; the passenger seat having a seat portion and a seatback that is adjustably positionable relative to the seat portion; wherein the headrest assembly comprises a rail, a headrest movably mounted on the rail, and a locking mechanism; wherein the installing comprises mounting the rail so that the rail is mounted to the seatback and disposed laterally proximate the seatback;
wherein the rail is mounted to a lateral portion of the seatback; the rail being elongate and extending along a rail longitudinal axis; the rail having a plurality of holes disposed in spaced relation to each other along the rail longitudinal axis;
wherein the headrest comprises a carriage frame slidably mounted on the rail and a cushion mounted to the carriage frame; wherein the carriage frame is rigid;
wherein the locking mechanism is operative to lock the headrest in a selected position along the rail; the locking mechanism comprising:
a locking pin configured to releasably engage with a hole of the plurality of holes in the rail; the locking pin biased toward the rail;
an actuator button operatively coupled to the locking pin such that depression of the actuator button moves the locking pin away from the rail so as to allow the headrest to be slidably moved relative to the rail;
wherein the headrest is slidably adjustable to two or more positions along the rail longitudinal axis to provide lateral support for a user's head when the user is sitting in the passenger seat; and
actuating the locking mechanism to allow the headrest to be slidably moved along the rail.

18. The method of claim 17, further comprising thereafter sliding the headrest along the rail longitudinal axis.

19. The method of claim 17, further comprising unsnapping the cushion from the carriage frame.

20. The method of claim 17, further comprising detaching the headrest from the rail by sliding the headrest upwardly off an upper end of the rail.

* * * * *